UNITED STATES PATENT OFFICE.

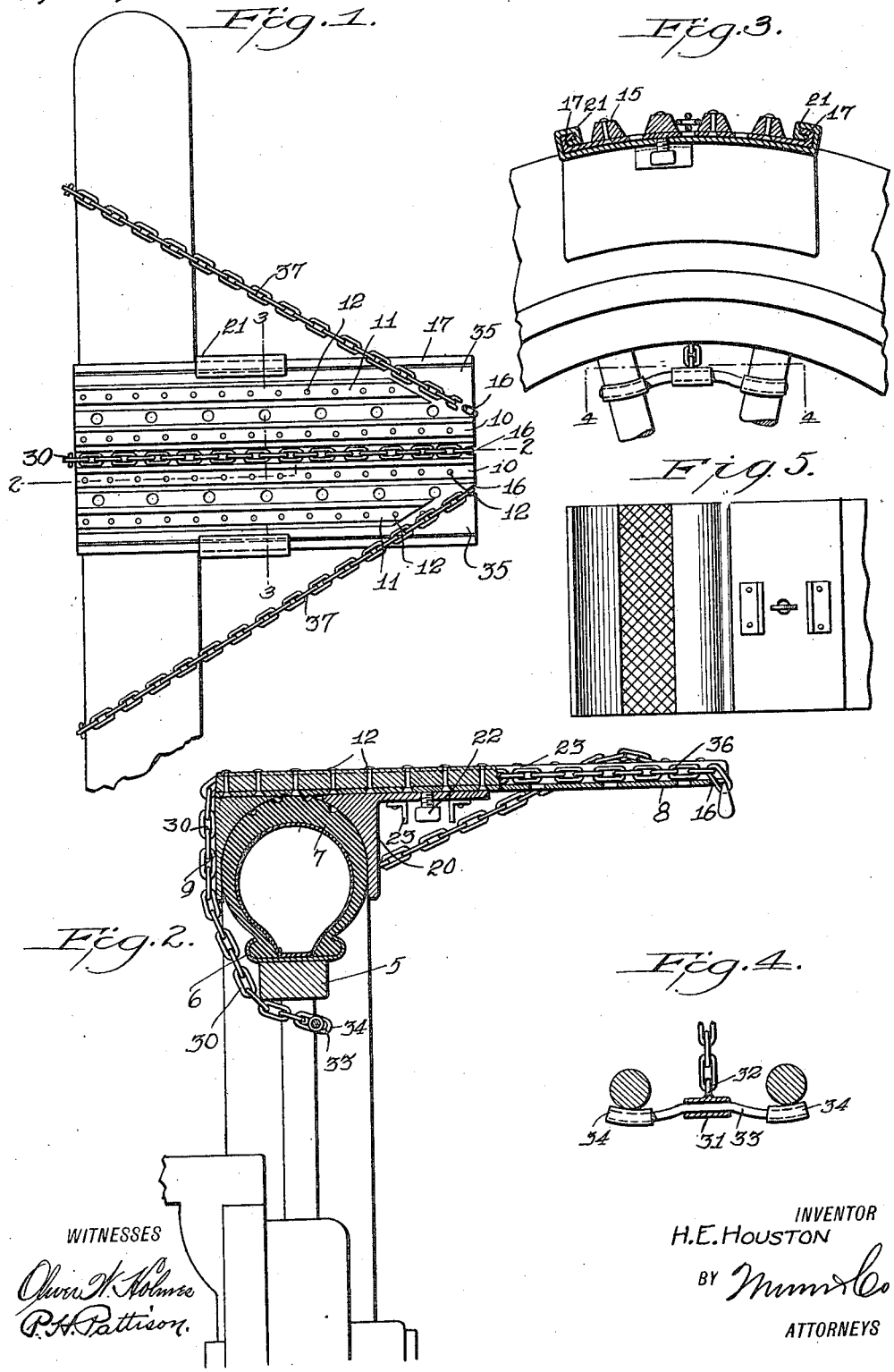

HUGH EDWARD HOUSTON, OF WICHITA FALLS, TEXAS.

TRACTION DEVICE.

1,383,948.     Specification of Letters Patent.     Patented July 5, 1921.

Application filed December 9, 1920. Serial No. 429,474.

*To all whom it may concern:*

Be it known that I, HUGH EDWARD HOUSTON, a citizen of the United States, and a resident of Wichita Falls, in the county of Wichita and State of Texas, have invented a new and Improved Traction Device, of which the following is a full, clear, and exact description.

The present invention relates to new and useful improvements in traction devices and it pertains more particularly to traction devices especially adapted for attachment to wheels of motor vehicles to enable the wheels to obtain a better traction grip on soft roads, in mud holes, and the like.

It is one of the primary objects of the invention to provide a device which may be readily attached to and detached from a motor vehicle wheel.

It is a further object of the invention to so construct such a device that greater traction service is provided than is afforded by the tread of the wheel.

It is a further object of the invention to construct a device of this character in such a manner that the same is adjustable to adapt it to wheels, the treads of which are of various dimensions.

It is a still further object of the invention to provide a novel and effective means for securing the device in position upon the wheel.

With the above and other objects in view, reference is had to the accompanying drawings, in which—

Figure 1 is a plan view of a traction device showing the wheel to which it is attached partly broken away;

Fig. 2 is a sectional view taken on the line 2—2 of Fig. 1;

Fig. 3 is a sectional view taken on the line 3—3 of Fig. 1 and at right angles to Fig. 2;

Fig. 4 is a detail sectional view taken on the line 4—4 of Fig. 3;

Fig. 5 is a bottom plan view of the adjustable clamping member.

Referring more particularly to the drawings, the reference character 5 designates the felly of a motor vehicle wheel, and 6 designates the rim upon which is carried a tire 7, the said tire 7 in the present illustration of the invention being of the pneumatic type.

The traction device comprises a substantially rectangular plate 8, and said rectangular plate 8 has one of its ends formed with an angularly-disposed portion 9 adapted to lie in engagement with one of the side walls of the tire when the device is positioned thereon. This traction member 8 is preferably constructed of steel and is provided on its outer or traction surface with a plurality of spaced ribs or cleats. There are two centrally disposed ribs or cleats 10, and spaced with respect to each of said centrally-disposed ribs or cleats 10 are side cleats 11. These cleats are each secured to the traction element 8 by means of rivets or the like 12, and said cleats are arranged in spaced relation to each other as indicated in Fig. 1. The cleats are tapered in cross-sectional form and are positioned with their narrowest face 15 disposed outwardly in order that the space between the cleats will be tapered inwardly of said cleats. The traction element 8 is provided upon its outer end with a plurality of notches 16, and said traction element is further provided upon its side edges with inwardly turned flanges 17, the purpose of which will be hereinafter more fully described.

The reference character 20 designates the clamping member which is preferably of approximately right-angular form, and said clamping member has its inner face so shaped as to conform to the contour of the tire casing 7, as more clearly shown in Fig. 2. The ends of one wall of the clamping member 20 are bent upwardly around the inwardly turned side flanges 17, as at 21, in order that said clamping member may be slidably carried by the traction member 8, thus providing for its adjustment, and to retain the clamping member 20 in adjusted position, said clamping member carries a screw or bolt 22. Upon opposite sides of the head of the bolt 22, are guard plates 23, and said guard plates extend outwardly beyond the head of the bolt 22 to protect the same when the device is in use.

The device is adapted to be secured in operative position upon the wheel by means of a plurality of chains. Extending longitudinally of the traction member 8 and centrally disposed with relation thereto in the recess between the two central cleats 10 thereof, is a chain 30. One end of this chain 30 is secured to a sleeve 31, as at 32, and said sleeve 31 is carried intermediate of the ends of a transversely extending bar 33. This bar 33 is provided upon its opposite ends with suitable protecting sleeves 34 formed of rubber or other suitable pliable material. This bar 33 is adapted to be passed between the spokes of the wheel to which the device is to be attached, and then turned so that its protected ends engage the spokes of the wheel to prevent displacement of the bar relative thereto. The opposite end of the chain 30 projects to the outer end of the traction member 8, and one of the links is adapted to be received within the central notch or opening 16. As more clearly shown in Fig. 1, the two opposite ribs or cleats are shorter than the two central ribs or cleats, and this construction provides flat faces 35 at the outer corners of the traction member 8.

Secured in each of the side notches 16 and extending inwardly toward the wheel, is a chain 37, and each of said chains 37 is secured to the wheel in advance and to the rear of the traction element 8 in a manner similar to that in which the central chain 30 is secured, it being understood that the chains 37 are angularly disposed with respect to the traction element 8.

In attaching the device to the wheel, if the outer end of the traction element 8 be slightly elevated before the chains are secured in the notches 16, it will be apparent that pressure exerted upon the traction element 8 will rock the same until it coincides with the surface over which the vehicle is traveling, and this rocking tends to tighten the chains in order that the traction device may be more securely retained in place.

While in the present invention the device has been shown as attached to the tire of the pneumatic type, it is obvious that the same may be used in connection with wheels or tires of any type with equal facility.

I claim:

A traction element comprising a plate provided with a rigid right-angular end adapted to embrace a portion of a wheel, a block slidably mounted on said plate and adapted to engage a portion of the wheel, said right-angular end and said block being so shaped as to conform to the outer portion of the wheel engaged, a plurality of ribs carried by the plate, a centrally disposed attaching chain extending longitudinally of the plate and engaging the spokes of the wheel at one end and the end of the plate at its other end, and diagonally arranged chains attached to one end of the plate at one of said ends, said chains diverging toward the wheel and secured thereto at a point exterior of the confines of the plate.

HUGH EDWARD HOUSTON.